(12) United States Patent
Pils et al.

(10) Patent No.: US 7,568,835 B2
(45) Date of Patent: Aug. 4, 2009

(54) TEMPERATURE SENSOR

(75) Inventors: Peter Pils, Stuttgart (DE); Ulli Rudischer, Winnenden (DE); Gerhard Waltner, Waiblingen (DE)

(73) Assignee: Otto Egelhof GmbH & Co. KG, Fellbach (DE)

( * ) Notice: Subject to any disclaimer, the term of this patent is extended or adjusted under 35 U.S.C. 154(b) by 141 days.

(21) Appl. No.: 11/506,606

(22) Filed: Aug. 19, 2006

(65) Prior Publication Data

US 2007/0071065 A1 Mar. 29, 2007

(30) Foreign Application Priority Data

Aug. 19, 2005 (DE) .................. 10 2005 039 607
May 12, 2006 (DE) .................. 10 2006 022 620

(51) Int. Cl.
*G01K 5/32* (2006.01)
(52) U.S. Cl. .................. 374/187; 374/190; 374/202; 374/143
(58) Field of Classification Search ............. 374/184, 374/190, 135, 143, 202
See application file for complete search history.

(56) References Cited

U.S. PATENT DOCUMENTS

| | | | | |
|---|---|---|---|---|
| 3,384,303 A | * | 5/1968 | Phillips | 236/87 |
| 3,417,919 A | * | 12/1968 | Baumann | 236/87 |
| 3,945,243 A | * | 3/1976 | Ouvrard | 374/24 |
| 4,023,397 A | * | 5/1977 | Ouvrard | 374/24 |

(Continued)

FOREIGN PATENT DOCUMENTS

EP 469535 A2 * 2/1992

(Continued)

OTHER PUBLICATIONS

Samson Pneumatic Transmitter for Temperature Type 812-1 (data sheet, obtained from http://www.samson.de/pdf_en/t75750en.pdf on Mar. 14, 2009).*

(Continued)

*Primary Examiner*—Patrick J Assouad
*Assistant Examiner*—Bret Adams
(74) *Attorney, Agent, or Firm*—Kriegsman & Kriegsman

(57) ABSTRACT

Temperature sensor with a temperature-dependent actuating device (12) comprising a capillary tube (14) which is filled with a gaseous or liquid medium which—in case of temperature changes along a measuring distance formed by the capillary tube (14)—effects a pressure or volume change and which comprises a path transmission element (16) which is provided medium-tight at one end of the capillary tube (14) and exerts a stroke movement depending on the pressure or volume in the capillary tube (14), and with a sensor which is designed as a Hall-effect probe (27) and which detects, contact-free, the stroke movement of the path transmission element (16) via a magnet (34) arranged on the path transmission element (16) or a section pointing toward the Hall-effect probe (27) on the path transmission element (16) of a magnetic material, characterized in that the path transmission element (16) is fixed on the housing bottom (25), and that a printed circuit board (28) taking up the Hall-effect probe (27) is arranged—separate from the path transmission element (16)—on a housing section (41, 38) adjacent to or opposite the housing bottom (25) of the housing (24).

15 Claims, 3 Drawing Sheets

U.S. PATENT DOCUMENTS

Figure 1:
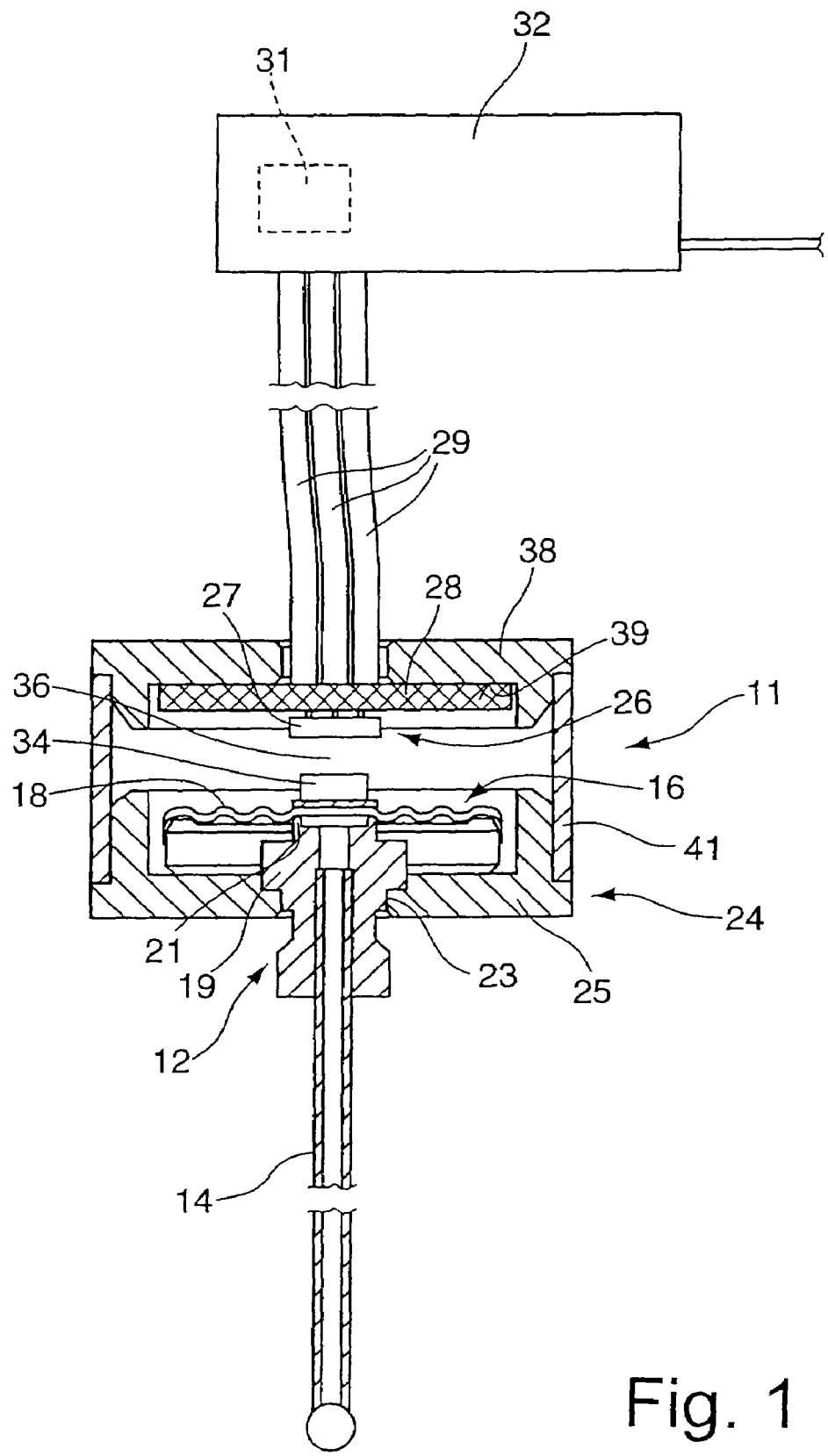

| | | | | |
|---|---|---|---|---|
| 4,091,992 A | * | 5/1978 | Stark | 236/44 C |
| 4,627,741 A | * | 12/1986 | Faller | 374/104 |
| 4,660,387 A | * | 4/1987 | Usami | 62/184 |
| 4,729,672 A | * | 3/1988 | Takagi | 374/208 |
| 5,702,592 A | * | 12/1997 | Suri et al. | 210/90 |
| 6,971,533 B2 | * | 12/2005 | Reutter | 220/201 |

FOREIGN PATENT DOCUMENTS

| | | | |
|---|---|---|---|
| EP | 696727 A1 | * | 2/1996 |
| EP | 0696727 A1 | | 2/1996 |
| EP | 0696727 B1 | * | 2/1996 |
| GB | 2247316 A | * | 2/1992 |

OTHER PUBLICATIONS

Johnson Controls Pneumatic temperature transmitter T-5210 (data sheet, obtained from http://www.vikingcontrols.com/_documents/Product/1921595.PDF on Mar. 14, 2009).*

"Temperature measurement with the hall variable capacitance temperature transducer" by George H. Hall, Full text and Abstract (obtained from IEEE Xplore Mar. 14, 2009).*

* cited by examiner

TEMPERATURE SENSOR

This invention relates to a temperature sensor according to the generic part of claim 1.

From EP 0 696 727 A1, a temperature sensor with a temperature-dependent actuating device is known which comprises a capillary tube filled with a gas or a liquid medium. A pressure change will be effected upon a temperature change along this measuring distance formed by the capillary tube. This pressure change is converted by a diaphragm box—connected, at the end of the capillary tube, medium-tight with the capillary tube—into a stroke movement depending on the pressure in the capillary tube. This stroke movement is detected by a sensor which comprises a Hall-effect element and a magnet which is fastened on the diaphragm box. The Hall-effect element is provided on a printed circuit board which is fastened via a mechanical adjustment by adjusting screws on a base plate, with the base plate taking up the capillary tube system and being enclosed by two housing parts of the temperature sensor. After installation and adjustment of the printed circuit board which takes up the Hall-effect element to the base plate, the housing will be closed by a third housing part. On the printed circuit board, resistance heating elements are additionally provided to heat it up—at ambient temperatures of below 15° C.-to a temperature of approx. 15° C. within the housing.

This temperature sensor with a capillary tube system has the disadvantage that an arrangement requiring complex installation is provided which requires a plurality of components. Moreover, there is no flexibility in the construction of such a temperature sensor.

Accordingly, the invention is based on the objective of providing a temperature sensor with a temperature-dependent actuating device which can be modularly structured and enables a decoupling of a path limiting element to the basic device.

This problem is solved according to the invention by the characteristics of claim 1. Additional advantageous embodiments and further developments are provided in the additional claims.

Simple and fast installation will be enabled by the physically separate take-up of the printed circuit board taking up the Hall-effect probe to the capillary tube system or, respectively, of the path transmission element which is arranged on a housing bottom. At the same time, a temperature sensor is created which can take up different components in the same housing for flexible applications. Also possible will be a fast and simple exchange of the printed circuit board with the Hall-effect probe arranged to it, as well as of the capillary tube system. Moreover, the number of structural components for the completion of the housing can be reduced.

According to an advantageous design of the invention, it is provided that a contact surface for the positioning of the printed circuit board will be provided on the housing section adjacent to or opposite the housing bottom. This contact surface is provided accurate to size versus a reference surface provided on the housing bottom so that an adjustment of the printed circuit board or, respectively, a setting of the distance of the Hall-effect probe to the path transmission element will be no longer required. The installation period can, in turn, be considerably reduced thereby. Moreover, the contact surface preferably enables that a defined alignment of the printed circuit board to the path transmission element is provided so that, in particular, the position of the Hall-effect probe will be ensured in the same axis to the path transmission element.

According to another preferred embodiment of the invention, it is provided that the printed circuit board can be inserted in a circumferential shoulder on the housing section adjacent to or opposite the housing bottom and will be closed, preferably medium-tight, by gluing, by a locking connection, clamping connection or screwing connection. The printed circuit board can simultaneously form a cover of the housing, thus enabling a maximum reduction of the components. Preferably, with this embodiment, it can be provided that the connecting points between the printed circuit board and the housing section will be closed, medium-tight, by means of a sealing element, by gluing, or by a flowable plastic or the like.

A preferred alternative embodiment of the invention provides that the printed circuit board is detachably fastened on a cover of the housing which is provided by a locking, screwing, clamping or gluing connection on the housing section. Thus, preassembly of the printed circuit board to the housing cover will be possible. At the same time, different printed circuit boards with Hall-effect probes provided thereon can be prefabricated and—depending on the case of application—allocated to a housing type, with the connecting points between the cover and the housing section being standardized.

Another alternative embodiment of the invention provides that the printed circuit board detachably fastened on the cover is held via a cylindrical wall section to the bottom. Preferably, this wall section is provided on the cover and/or housing bottom by a clamping, locking, screwing connection, as well as by a welding or gluing connection. Simple and fast installation will thus be provided. At the same time, parts can be preferably provided of plastic which are inexpensive in their geometry and manufacture. Via the cylindrical wall section, a different distance setting of the Hall-effect probe to the path transmission element can be enabled so that—by a selection of different lengths of cylindrical wall sections—an exact distance setting can be enabled for the different sensor elements.

The pressure change in the temperature-dependent actuation device is preferably detected by the sensor and is output especially as a path dependent potential. Such a signal can enable two-point control, comprising an upper and a lower threshold value, with the output signal being compared with these threshold values. Also, a linear detection of data will be enabled which are directly depending on the respective temperature change so that temperature progressions are also detectable during a process or a certain period of time.

Another preferred embodiment of the invention provides that the housing comprises a housing section for the take-up of a plug connection, with a printed circuit board being provided in the plug connection and contactable or connected with the printed circuit board taking up the Hall-effect sensor. Due to this coupling of the plug connection with the housing bottom accepting the path transmission element, a decoupling of the capillary tube system to the basic device will be possible. This basic device is provided with an additional electronic unit, with the basic device mostly being used in control systems. Thus, directly at the measuring location, a compact-built temperature sensor can be provided which enables autonomous operation.

According to a preferred embodiment of the invention which comprises a plug connection with a printed circuit board on the housing bottom, it is provided that the printed circuit board provided in the plug connection transforms a sensor signal into an analog and temperature-independent standard signal. Thus, autonomous operation of a temperature sensor directly on location will be enabled, and through a signal line, a standard output signal is transmitted to a control system arranged at a distance thereto. Furthermore, heating of the sensor can be entirely omitted with such autonomous operation. Due to this design, the basic device no longer needs to be temperature-adjusted to temperatures of above a set threshold value since the capillary tube system with the sensor is located outside of the basic device.

According to another advantageous embodiment of the invention, it is provided that the path transmission element and the capillary tube are firmly provided in a connection piece which can be set into the housing bottom. Thus, a first assembly group can be created which is provided replaceably to the housing bottom. A second assembly group can present at least the housing bottom. A third assembly group is either provided by a cover which takes up the printed circuit board with the Hall-effect probe and which can be fastened on the housing bottom or on a housing section on the housing bottom, or by the printed circuit board itself which engages on a housing bottom with a housing section arranged thereto.

The connecting piece is preferably mechanically adjustable in the distance to the housing bottom, preferentially by a thread. Thus, the path transmission element is adjustable in the distance to the housing bottom and thus to the contact surface on another housing section on which the printed circuit board is aligned. Preferably, the connecting piece comprises a threaded section by which the mechanical adjustment is enabled in a simple manner.

The path transmission element is preferably designed as a diaphragm box according to a first embodiment. Alternatively, the path transmission element can also be provided as a bellows or siphon.

Such temperature sensors according to the invention are preferably used as antifreezing monitors. They are used for monitoring the temperature of large-surface plant parts against freezing, for example, in air heaters, in air, heating and air-conditioning systems, but also for water lines or air ducts. Additional areas of application are air/water heat exchangers for heating air where a risk of freezing exists due to air flowing in. In the same manner, such temperature sensors are used to protect against freezing and, for example, switch off fans on time, or open heating valves, or close air flaps. Moreover, the application can also be provided for heating watering troughs in animal stables.

Figure 2:
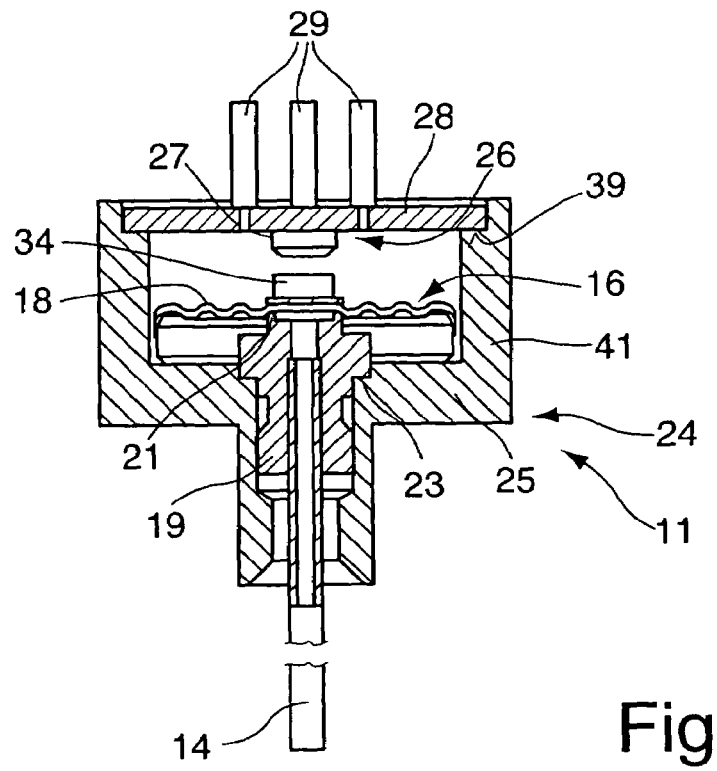
Figure 3:
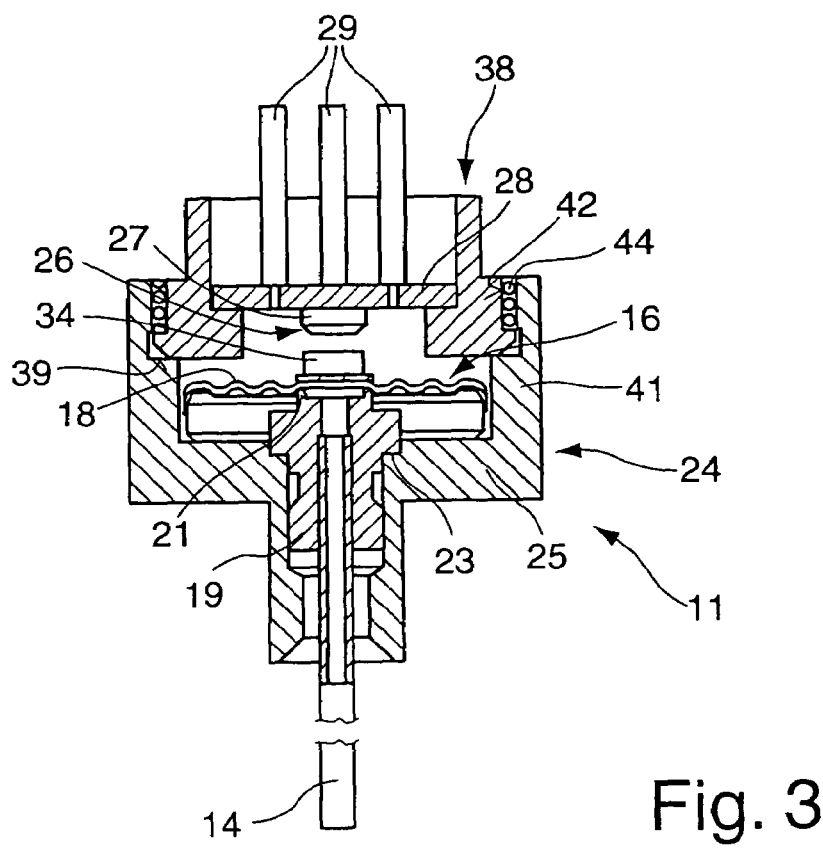
Figure 4:
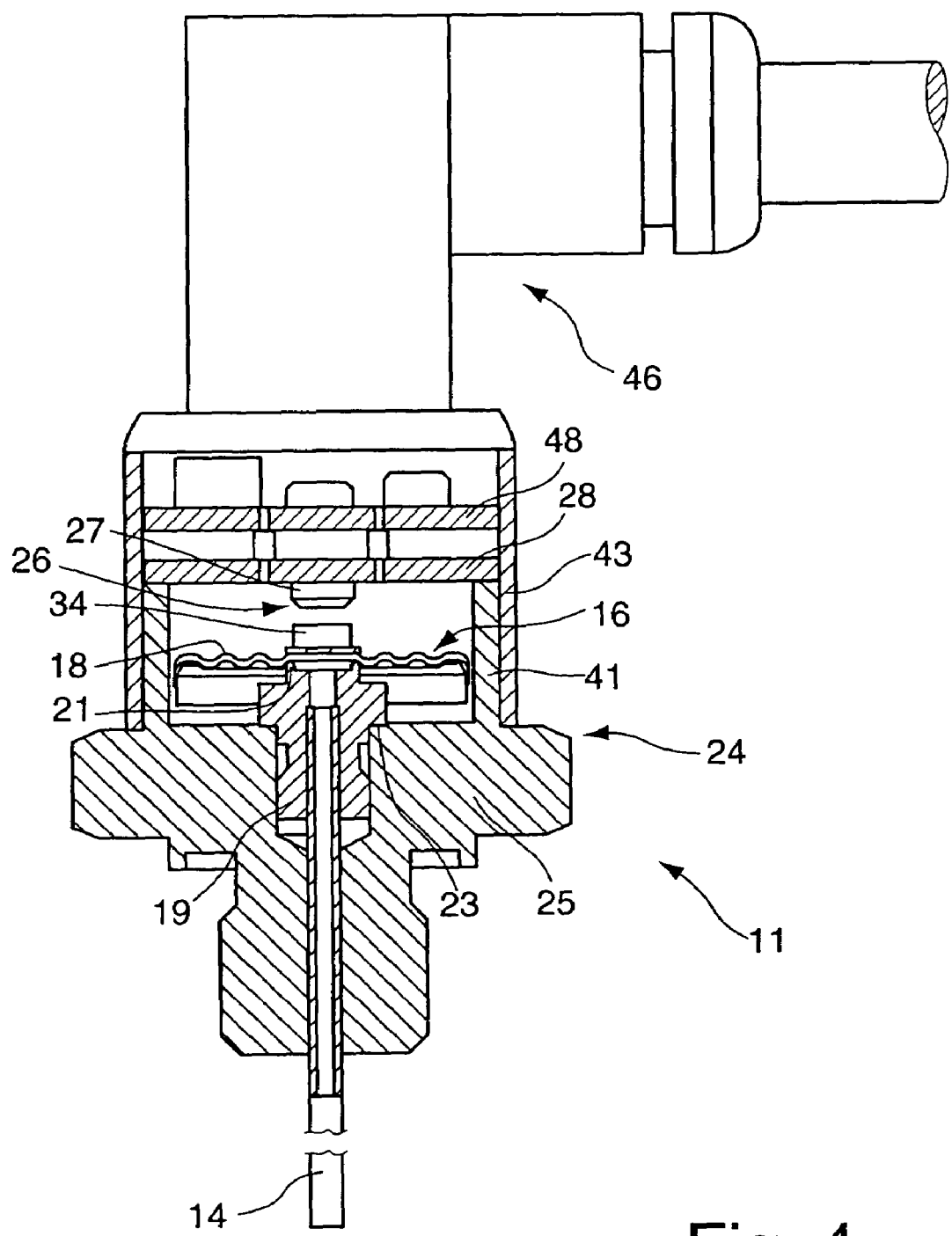

In the following, the invention as well as additional advantageous embodiments and developments of the same will be explained and described in detail on the basis of the example presented in the drawing. The features which can be gathered from the description and the drawing can be used individually by themselves or in a plurality in any combination according to the invention. It is shown in:

FIG. 1 a diagrammatic sectional view of the temperature sensor according to the invention;

FIG. 2 a diagrammatic sectional view of an alternative embodiment of a temperature sensor according to FIG. 1;

FIG. 3 a diagrammatic sectional view of another alternative embodiment of a temperature sensor according to FIG. 2, and FIG. 4 a diagrammatic sectional view of a temperature sensor with a plug connection.

FIG. 1 presents a temperature sensor 11 according to the invention in a full cross-section. This temperature sensor 11 comprises a temperature-dependent actuating device 12, comprising a capillary tube 14 which is connected medium-tight with a path transmission element 16. In the exemplary embodiment, the path transmission element 16 is designed as a diaphragm box. Alternatively, the path transmission device 16 can also be designed as a bellows or siphon. The capillary tube 14 can be designed up to several meters long and comprise additional measuring gauges. The temperature-dependent actuating device 12 is filled with a gas or a liquid. Depending on the temperature, there is at least partially a pressure or volume change in the capillary tube 12, whereby a stroke movement of the path transmission element 16 is effected. In the exemplary embodiment, the membrane 18 of the diaphragm box is thereby moved back and forth or, respectively, is deflected.

Between the path transmission element 16 and the capillary tube 14, a connecting piece 19 is provided which preferably comprises a circumferential shoulder 21 on which the path transmission element 16 designed as a diaphragm box is fastened. The connecting piece 19 is fastened via a section 23 on the housing 24. This connecting piece 19 can be connected with the housing 24 for example by a screwing, gluing, clamping, soldering or welding connection or the like. A screw connection enables, in particular, an adjustment of the capillary tube system in the distance to the housing bottom 25, with the capillary tube system comprising the capillary tube 14 and the path transmission element 16.

Opposite the path transmission element 16, the housing 24 takes up a sensor 26 which is designed as a Hall-effect probe 27. This Hall-effect probe 27 is fastened, for example, on a printed circuit board 28 or PCB, from which electrical supply leads 29 are leading through the housing 24. These electrical supply leads 29 can be connected with a control unit 31 which is, for example, part of a display device and/or an analyzing computer 32. The electrical supply leads 29 are used for energy supply and signal transmission. The printed circuit board 28 is provided on a cover 38 of the housing. For example, a depression is provided in the cover 38 which comprises a contact surface 39 for the positioning and take-up of the printed circuit board 28. This contact surface 39 comprises lateral edges so that the printed circuit board, upon setting in, is aligned in a defined position to the magnet 34. The printed circuit board 28 can be positioned by a locking, gluing or clamping connection to the contact surface 39 of the cover 38.

In the embodiment according to FIG. 1, the cover 38 is positioned by a housing section or a wall section 41 to the housing bottom 25 and taken up at a defined distance. The wall section 41 is preferably cylindrical in design. For fastening the housing bottom 25 and the cover 38 on the wall section 41, gluing connections, screw connections, locking connections, welded connections can be provided, with the connection preferably, but not necessarily, being identically designed between the wall section 41 and the cover 38 as well as between the wall section 41 and the housing bottom 25. The distance between the Hall-effect probe 27 and the magnet 34 is adjustable via the length of the tubular wall section 41.

The housing 24 entirely encompasses the path transmission device 16 and the sensor 26 so that—independent of external influences—a stroke movement of the path transmission element 16 or, respectively, of the membrane 18 is detectable. On the external side of the membrane 18, a magnet 34 is provided for this which is glued onto the membrane 18, or pressed in, clamped in, or the like. Such a magnet 34 can be provided analogously on a bellows or siphon as a path transmission element 16. Between the magnet 34 and the Hall-effect probe 27, a defined distance 36 is provided which is adjustable. For example, to adjust the distance, one upper housing half which takes up the sensor 26 can be provided displaceably or screwably versus a lower housing half which takes up at least the path transmission element 16. Additionally or alternatively, the path transmission device 16 and the sensor 26 can each be displaceable in position versus its take-up section of the housing 24.

A gaseous as well as a liquid medium can be used as a filling medium. Gaseous mediums can be provided with a defined pressure in the temperature-dependent actuating device 12 to achieve, at a specific temperature, for example a condensation of the gas so that a specific signal will be detected and output upon an external condition to be monitored.

The temperature sensor 11 according to the invention enables the use of inexpensive temperature-dependent actuating devices 12 in which the stroke movement of the path transmission device 16 can be queried contact-free. Via the sensor 26, a linear ratiometric output signal can be generated. Thus, a direct detection of a pressure or volume change in the temperature-dependent processing device 12 is also provided, such as, for example, a temperature-dependent steam pressure which is queried upon the use of the temperature regulator as an antifreezing sensor.

Alternatively to the sensor 26 designed as a Hall-effect probe 27, it can be provided that the sensor detects a capacitive change as well as an inductive change which is generated by the stroke movement.

FIG. 2 presents an alternative embodiment to FIG. 1. The housing 24 comprises a housing bottom 25 with a directly connected wall section 41 formed in one piece which serves as a contact surface 39 on the upper edge of a circumferential shoulder. In the housing bottom 25, the capillary tube system is fastened via the connecting piece 19 and installed in a defined position. A complete screw-in position of the capillary tube system in the housing bottom 25, as well as the distance of the contact surface 39 to the housing bottom 25 is provided in a defined manner so that—after inserting the printed circuit board 28—a preliminary adjustment or an exact adjustment of the sensor elements 27, 34 is provided. The printed circuit board 28 is glued in or pressed in, for example, with the connecting points being subsequently closed medium-tight with a flowable plastic. Due to the shoulder provided on wall section 41, an alignment of the printed circuit board 28 is furthermore enabled in radial direction so that the Hall-effect probe 27 is provided in the stroke axis of the path transmission element 16.

FIG. 3 presents an alternative embodiment to the FIGS. 1 and 2. With this embodiment, a cover 38 is provided which is applied by screwing or by a twist-lock connection. Alternatively, an insertable cover 38 can also be provided which rests upon the contact surface 39, with a locking element 44 being subsequently inserted between the wall section 41 and a ring section 42 of the cover 38. The cover 38, in turn, will preferably exchangeably take up the printed circuit board 28.

FIG. 4 presents another alternative embodiment of the invention. This embodiment comprises a cylindrical wall section 41 formed in one piece on a housing bottom 25. This wall section 41 is surrounded by a fastening section 43 of a plug connection 46; this can be fastened, for example, via a screw connection in the wall section 41. In the fastening section 43, the printed circuit board 28 is taken up which rests on a face side of the wall section 41 which is designed as a contact surface 39. In the fastening section 43, a printed circuit board 48 is moreover provided which can be plugged on the printed circuit board 28 or connected with it.

Such a temperature sensor enables autonomous operation. The data signals are transmitted through the printed circuit board 48 as linear temperature-dependent standard analog signals to a control system via a cable. In the control system, a basic unit is provided which comprises additional control elements of the temperature sensor. This temperature sensor enables a decoupling to the basic unit, with a standardized signal being output.

The above described housings 24 of the embodiments according to FIGS. 1 to 4 are designed such that they are at least spray water proof, preferably water proof. Moreover, the individual housing parts are designed of plastic, especially as an injection molded part. Due to the above described arrangement of the housing parts to each other, a modular structure with different components will be enabled, thus providing simple and fast installation and adjustment of the distance between the Hall-effect probe and the path transmission element, as well as a flexible fitting of sensor elements and capillary tube systems.

All of the above mentioned features are essential for the invention and can be randomly combined with each other.

The invention claimed is:

1. Temperature sensor with a temperature-dependent actuating device comprising a capillary tube which is filled with a gaseous or liquid medium which—in case of temperature changes along a measuring distance formed by the capillary tube—effects a pressure or volume change and which comprises a path transmission element which is provided medium-tight at one end of the capillary tube and exerts a stroke movement depending on the pressure or volume in the capillary tube, and with a sensor which is designed as a Hall-effect probe and which detects, contact-free, the stroke movement of the path transmission element via a magnet arranged on the path transmission element or a section pointing toward the Hall-effect probe on the path transmission element of a magnetic material, characterized in that the path transmission element is fixed on the housing bottom, and that a printed circuit board taking up the Hall-effect probe is arranged physically separate from the path transmission element on a further housing section adjacent to or opposite the housing bottom of the housing.

2. Temperature sensor according to claim 1, characterized in that a contact surface is provided for the positioning of the printed circuit board on the housing section adjacent to or opposite the housing bottom.

3. Temperature sensor according to claim 2, characterized in that the contact surface is aligned in a defined distance to the housing bottom.

4. Temperature sensor according to claim 1, characterized in that the printed circuit board is insertable into a circumferential shoulder on the housing section adjacent to the housing bottom and closed by a gluing, locking, or screwing connection, preferably medium-tight.

5. Temperature sensor according to claim 1, characterized in that the printed circuit board is detachably fastened on a cover of a housing which is provided by a locking, screwing, clamping or welding connection on the housing section, with the printed circuit board or the cover resting against a contact surface in a defined condition.

6. Temperature sensor according to claim 1, characterized in that the printed circuit board is detachably connected on a cover and the cover is held to the housing bottom via a cylindrical wall section which is fastened on the cover and/or the housing bottom by a clamping, locking, screwing, or welding connection.

7. Temperature sensor according to claim 1, characterized in that the pressure or volume change in the capillary tube with the path transmission element is detectable by the sensor as a path dependent potential.

8. Temperature sensor according to claim 1, characterized in that the housing comprises a housing section for taking up a plug connection, with a printed circuit board being provided in the plug connection which is contactable or connected with the printed circuit board taking up the Hall-effect probe.

9. Temperature sensor according to claim 8, characterized in that the printed circuit board provided in the plug connection transforms a sensor signal into an analog, temperature-independent standard signal.

10. Temperature sensor according to claim 1, characterized in that the path transmission element and the capillary tube are firmly provided on a connecting piece which is insertable into the housing bottom.

11. Temperature sensor according to claim 10, characterized in that the path transmission element is mechanically adjustable, preferably by a thread, in the distance to the housing bottom by the connecting piece.

12. Temperature sensor according to claim 1, characterized in that the housing is shielded.

13. Temperature sensor according claim 1, characterized in that the path transmission element is designed as a diaphragm box.

14. Temperature sensor according to claim 1, characterized in that the path transmission element is designed as a bellows or siphon.

15. Temperature sensor according to claim 1, characterized in that it can be used as an antifreezing monitor.

* * * * *